Patented Sept. 16, 1924.

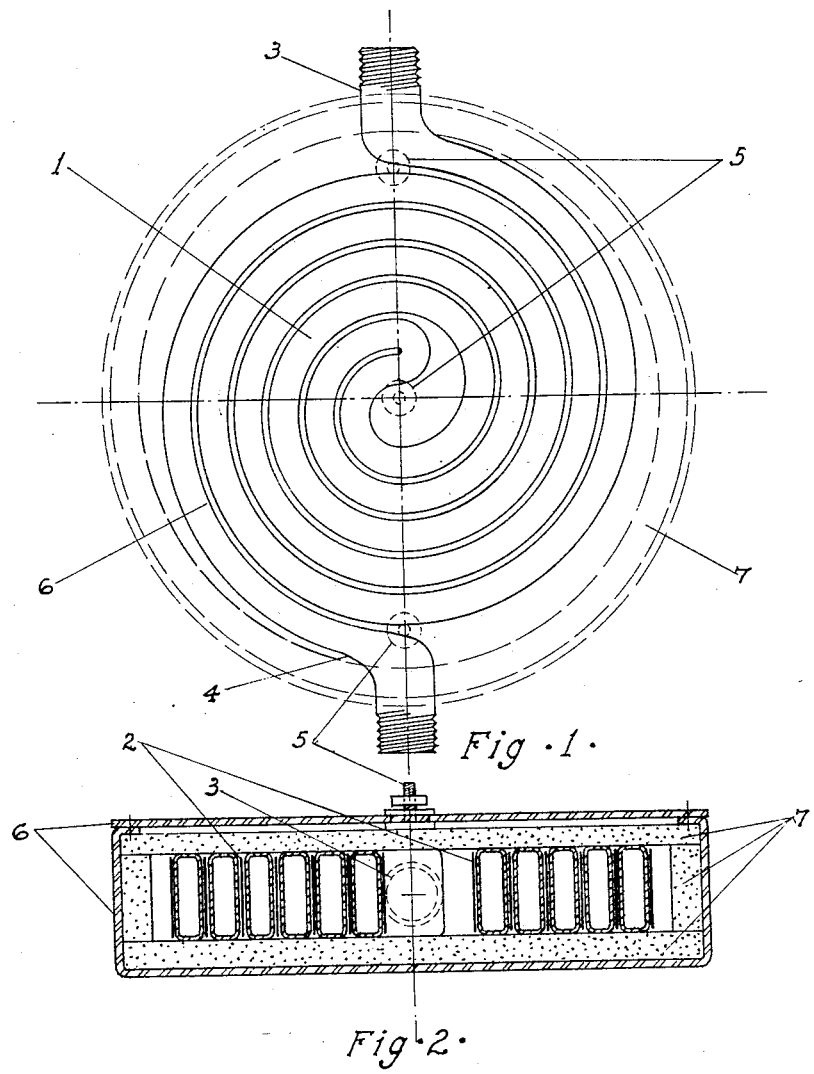

1,509,042

UNITED STATES PATENT OFFICE.

WILLIAM M. R. KAY, OF WINDSOR, ONTARIO, CANADA.

ELECTRIC WATER HEATER.

Application filed November 6, 1922. Serial No. 599,440.

*To all whom it may concern:*

Be it known that I, WILLIAM MAHLON REID KAY, a subject of the King of Great Britain, residing at the city of Windsor, in the county of Essex, in the Province of Ontario, Dominion of Canada (whose post-office address is 81 Cameron Avenue, Windsor, Ontario), electrician, have invented new and useful Improvements in an Electric Water Heater, of which the following is a specification.

This invention relates to electric water heaters of the class particularly adapted for domestic use.

The chief object of my invention is to provide an electric heater to heat water continuously and most economically, by means of the arrangement and adjustment of the water conduit with the insulated heating unit in a manner designed to bring the greatest amount of heating surface of the metal water conduit into uniformly close insulated contact with the heating element.

Another object of my invention is to provide an electric heater simple and economical of construction, whose parts are standardized and interchangeable at minimum cost.

The preferred form of my invention is exemplified in the drawings, in which the insulated heating unit is coiled in close contact with the flat sides of a very thin metal water conduit.

In the accompanying drawings,—

Figure 1, is a plan view of the metal water conduit, showing in addition the insulated housing in dotted lines.

Figure 2, is a vertical cross section of the metal water conduit, of the heating unit and of the insulated housing.

1, indicates the thin, flattened metal water conduit, reversed upon itself and closely double coiled;

2, indicates insulated heating element or resistance, also closely coiled and designed to enter and occupy the interstices between the coils and enveloping the double coils of the metal water conduit;

3, indicates the inlet to the metal water conduit;

4, indicates the outlet of the metal water conduit;

5, indicates three terminals to the electrical resistance;

6, indicates the metal housing;

7, indicates heat resisting insulation lining the metal housing.

Referring more particularly to the drawings, it will be seen that I provide a housing, 6, lined with heat resisting insulating material, preferably asbestos, 7, within which housing is mounted a metal conduit, 1, folded back longitudinally of itself and double coiled, the metal conduit, in its preferred form, being very thin and wide, so that when the insulated resistance, 2, is placed between the coils, both wide sides of the conduit come in close contact with the insulated heating element for instantaneous and continuous heating of a stream of water passed through the conduit.

What I claim as my invention, and desire to secure by Letters Patent, is—

In an electric water heater, a casing or housing, and a lining of non-heat conducting material for said housing, and two coils of flattened rectangular metal conduit, and means for heating said coils comprising two flattened heat resistance elements placed between and adjacent to but insulated from the broad sides of the two said coils, all substantially as set forth.

Signed at Windsor, Ontario, this 10th day of October, 1922.

WM. M. R. KAY.

Witnesses:
 IRENE M. HIGGINS,
 JESSIE V. LORD.